Oct. 4, 1932.    E. W. DAVIS    1,880,856
LUBRICATING SYSTEM
Filed June 16, 1928
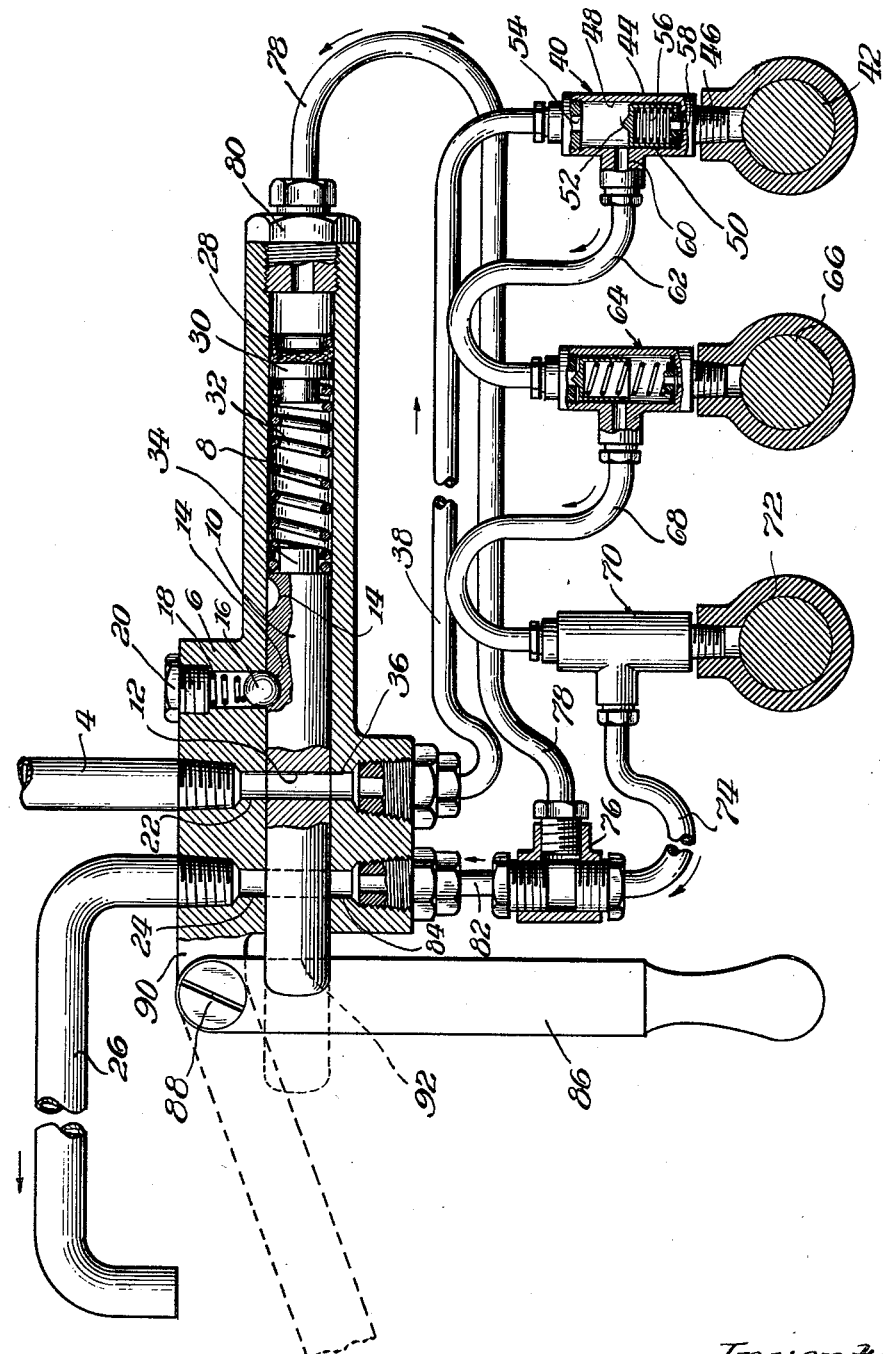
Inventor
Ernest W. Davis.
By Williams, Bradbury, McCaleb & Hinkle
Attys.

Patented Oct. 4, 1932

1,880,856

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed June 16, 1928. Serial No. 285,956.

My invention relates, generally, to lubricating systems and more particularly to a valve for controlling the supply of lubricant to a plurality of bearings. It is beginning to become the practice to lubricate a plurality of machines, as in a machine shop or factory, from a single source of lubricant under pressure and to control the supply of lubricant to each machine in accordance with the needs thereof. In systems of this kind a piping system having a branch leading to each of the machines is normally kept supplied with lubricant under high pressure and therefore some valve means is necessary to control the flow of lubricant from the branch pipe to the bearings of the machine. An ordinary manually-operable valve is unsatisfactory since the operator may fail to turn it off at the proper time, thus, if he turns it off too soon, failing to lubricate some of the bearings of the machine and if he turns it off too late, causes waste of lubricant.

It is therefore among the objects of my invention to provide a valve which may be manually opened but which will automatically be close as soon as all of the bearings of the machine have been lubricated.

A further object is to provide a manually-opened valve in combination with a series of progressively-operable measuring devices and having the last valve of the series connected so as to permit flow of lubricant back to the valve, to close the same after said last measuring device has operated.

It is a further object of my invention to provide an improved valve of the above-described type which is simple in construction, may be economically manufactured and which will operate satisfactorily under various conditions of usage.

Other objects will appear from the following description, reference being had to the accompanying drawing which shows the improved valve, partly in section, connected with a series of progressively-operable measuring devices.

In the drawing, the pipe 4 is representative of one branch of a multibranched conduit system which leads from a suitable lubricant compressor which is adapted constantly to maintain a predetermined pressure in the multibranched conduit, including the pipe 4. It will be understood that the drawing is illustrative of a controlling valve and measuring devices associated with one group of bearings forming a part of one machine, a line shaft, or in some instances a part of one machine or several machines.

The pipe 4 is threaded in a body 6 of the controlling valve. The body has a substantially central longitudinal bore 8 forming a cylinder for a slide valve 10 which is in the form of a cylindrically-shaped plunger having a passageway 12 drilled transversely therethrough. The valve 10 also has a pair of spaced hemispherical depressions 14 which are adapted to receive a ball detent 16 which is resiliently biased to enter one of said depressions by a spring 18, the latter being held in place by a threaded plug 20.

The detent is thus adapted to hold the valve 10 in the position in which the passageway registers with an inlet 22 from the pipe 4 or with an outlet 24 which leads to a discharge conduit 26. A cup leather piston 28 having a suitable backing plate 30 is normally held approximately in the position shown by a coil spring 32, the left-hand end of which abuts against the end of the valve 10, a suitable projection 34 being formed at the end of the valve 10 to guide and hold the spring in position.

A passageway 36 is formed diametrically opposite the inlet 22 and is connected by a suitable conduit 38 with the inlet of a measuring device 40 secured to a bearing 42. Measuring devices of this type are shown and claimed in my copending application, Serial No. 219,837, filed September 16, 1927, and will be but briefly described herein.

Each of these devices comprises a body 44 having an end portion 46 threaded into the bearing and having a cylindrical bore 48 in which a piston valve 50 is reciprocable. The piston valve 50 has a conical projection 52 at its upper end which is adapted to seat against and close the inlet port 54. The valve 50 is normally held in its uppermost position with the valve 52 closing the inlet port 54, by a spring 56. A discharge passageway 58 connects the lower end of the cylinder 48 with the bearing and an outlet passageway 60 is connected by a suitable conduit 62 to the next measuring device 64 of the series, which device 64 is of the same construction as the device 40 and is attached to a bearing 66. The outlet of the device 64 is connected by a conduit 68 to a third measuring device 70 attached to bearing 72. The outlet of the device 70 is connected by a conduit 74 to a T 76. A conduit 78 leads from the T to the right-hand end of the controlling valve body 6, being connected thereto by a suitable union 80.

The T 76 has a third conduit 82 connected thereto which leads to a passageway 84 in the controlling valve body 6, the passageway 84 being diametrically opposite the outlet 24. A handle 86 is pivoted upon a screw 88 which is threaded in a lug 90 projecting from the left-hand end of the body 6. The handle 86 fits in a kerf-like slot 92 formed in the end of the valve 10.

The controlling valve is shown in open position. When in this position, the lubricant flows from the pipe 4 through the inlet 22, passageways 12 and 36, conduit 38, to the inlet 54 of the first measuring device 40 of the series.

It will be understood that upon application of pressure the valve 50 will have been forced downwardly from the position in which its valve 52 sealed the inlet port 54, to the position shown wherein the lower edge of the cylindrical valve 50 seals against the end of the cylinder 48. During the downward movement of the valve 50 the lubricant contained beneath the valve is forced into the bearing and as the valve approaches its lowermost position the outlet port 60 is uncovered, permitting the lubricant to flow through the conduit 62 to the next measuring device 64 of the series in which the valve 50 is shown in normal position.

The device 64 will operate in a manner similar to that above described with reference to the device 40, ejecting a charge of lubricant to the bearing 66 and uncovering the outlet port, thereby permitting the lubricant to flow to the next device 70 of the series.

It will be understood that although only three of the measuring devices have herein been shown and described, practically any number may thus be connected in series, the only limitation being that the total flow resistance of all of the devices and their connecting conduits must not be sufficient to reduce the pressure below the amount necessary properly to actuate the devices.

After the last device of the series, here represented as the device 70, has operated, lubricant will flow through the T 76 and conduit 78 to the cylinder 8 of the control valve, thereby forcing the cup leather piston 28 to the left and compressing spring 32. After it has moved to the left a certain distance, the spring 32 will be sufficiently compressed to overcome the detaining force of the spring-pressed detent 16 and will consequently force the valve 10 to the left until the ball detent 16 engages the depression 14, thus cutting off the flow of lubricant from the pipe 4 to the measuring devices and opening communication between the passageway 84 and the outlet 24. When the valve is in this position the spring 32 will expand, forcing most of the lubricant contained in the cylinder 8 through the conduit 78, T 76, conduit 82, passageway 84, passageway 12, outlet 24 and pipe 26, to any suitable device requiring lubrication, such, for example, as a spur-gear and pinion (not shown).

When the valve 10 is again manually moved to the position as shown in the drawing by operation of the lever 86, the spring 32 will be slightly compressed since after slight initial movement of the valve 10 there is no means for the escape of lubricant from the right-hand end of cylinder 8. This slight compression of the spring 32, however, is insufficient to overcome the holding force of the detent 16.

The invention is capable of wide variation within equivalent limits and I contemplate such variations as may be desirable or useful in the particular adaptation of the invention shown, or in its adaptation to other devices. I do not restrict myself in any unessential particulars, but what I claim and desire to secure by Letters Patent is:

1. In a lubricating system of the class described, the combination of a plurality of bearings to be lubricated, a group of progressively operated charge determining devices connected in series, one of said devices being associated with each of said bearings, a source of lubricant under pressure, a valve manually operable to connect said source to the first device of the series, a conduit connecting the outlet of the last device of the series with said valve, and means operable upon flow of lubricant under pressure in said conduit to close said valve and vent said conduit.

2. In a system of the class described, the combination of a series of interconnected progressively operable measuring devices, a manually operable valve for admitting lubricant under pressure to the first device of the series, and means automatically controlled by the operation of the last device of the series for closing said valve.

3. In a system of the class described, the combination of a plurality of progressively operated measuring devices connected in series, a valve for admitting lubricant under pressure to the first device of the series, a detent for holding said valve in open position, and means actuated by the flow of lubricant from the last device of the series to overcome the holding force of said detent and restore said valve to closed position and to relieve the pressure at the outlet of said last device.

4. In a system of the class described, the combination of a plurality of progressively operated measuring devices connected in series, a reciprocable valve for admitting lubricant under pressure to said devices, means to hold said valve in open position, and means actuated by the flow of lubricant from the last device of the series to release said holding means and move said valve to closed position.

5. In a lubricating system of the class described, the combination of a plurality of bearings to be lubricated, a group of progressively operated lubricant measuring devices connected in series, one of said devices being associated with each of said bearings, a valve manually operable to connect a source of lubricant under pressure to the first device of the series, a conduit connecting the outlet of the last device of the series with said valve, and means operable upon flow of lubricant under pressure in said last-named conduit to close said valve.

6. In a system of the class described, the combination of a series of connected measuring devices, a valve for admitting lubricant under pressure to the first device of the series, and means automatically controlled by and immediately subsequent to operation of the last device of the series to close said valve.

7. In a lubricating system of the class described, the combination of a plurality of bearings to be lubricated, a group of charge determining devices connected in series, one of said devices being associated with each of said bearings, a valve manually operable to connect a source of lubricant under pressure to the first device of the series, a conduit connecting the outlet of the last device of the series with said valve, means operable upon flow of lubricant under pressure in said last-named conduit to close said valve and relieve said pressure and spring detent means to limit the movement of said valve.

8. In a system of the class described, the combination of a plurality of progressively operating measuring devices connected in series, a valve for admitting lubricant under pressure to the first device of the series, a detent for holding said valve in open position, and means actuated by the flow of lubricant from the last device of the series to overcome the holding force of said detent and restore said valve to closed position, said means comprising a cylinder, a piston in said cylinder and a resilient connection between said piston and said valve.

9. In a system of the class described, the combination of a group of measuring devices, a slide valve for controlling the admission of lubricant to said devices, a cylinder adjacent said slide valve, a piston reciprocable within said cylinder, a resilient connection between said piston and said slide valve, and a conduit connecting one of said devices with said cylinder whereby upon flow of lubricant under pressure in said last-named conduit said piston will be moved in said cylinder and through its resilient connection restore said slide valve to closed position.

10. In a system of the class described, the combination of a measuring device, a lubricant conduit, a manually operable valve in said conduit for controlling admission of lubricant under pressure to said device, and means automatically operated upon completion of the operation of said measuring device to restore said valve to closed position and relieve said pressure.

11. In a lubricating system of the class described, the combination of a valve body having a cylindrical bore, a valve reciprocable therein, a pair of transverse passageways in said body adapted alternately to be opened by said valve, a floating piston in said bore, a compression spring between said piston and said valve, and means for supplying lubricant under pressure to the end of said bore adjacent said piston thereby to move said piston, compress said spring and move said valve and thereby open one of said passageways and close the other.

12. In a lubricating system of the class described, the combination of a valve body having a bore, a slide valve therein, a pair of transverse passageways adapted alternately to be opened by said valve, a detent for holding said valve in position in which one of said passageways is open, a floating piston in said bore, a compression spring between said piston and said valve, and means for supplying lubricant under pressure to the end of said bore adjacent said piston thereby to move said piston, compress said spring and move said valve to close the formerly open passageway and open the formerly closed passageway.

13. In a system of the class described, the combination of a group of progressively operated measuring devices connected in series, a slide valve for controlling the admission of lubricant to the first device of the series, a cylinder adjacent said slide valve, a piston reciprocable within said cylinder, a spring between said piston and said slide valve, and a conduit connecting the last device of the series with said cylinder whereby upon flow of lubricant into said cylinder said piston will be moved and through said spring restore said slide valve to closed position.

14. In a system of the class described, the combination of a plurality of progressively operated measuring devices connected in series, a valve for admitting lubricant under pressure to the first device of the series, a detent for holding said valve in open position, and means actuated by the flow of lubricant from the last device of the series to overcome the holding force of said detent and restore said valve to closed position.

15. In a system of the class described, the combination of a series of connected progressively operable measuring devices, a manually opened valve for admitting lubricant under pressure to the first device of the series, and means automatically controlled by the operation of the last device of the series for closing said valve.

16. In a system of the class described, the combination of a group of progressively operated measuring devices connected in series, a slide valve for controlling the admission of lubricant to the first device of the series, a cylinder adjacent said slide valve, a free piston reciprocable within said cylinder, a resilient connection between said piston and said slide valve, and a conduit connecting the last device of the series with said cylinder whereby upon flow of lubricant under pressure in said last-named conduit said piston will be moved in said cylinder and through its resilient connection restore said slide valve to closed position.

In witness whereof, I hereunto subscribe my name this 12th day of June, 1928.

ERNEST W. DAVIS.